(12) United States Patent
Collins

(10) Patent No.: US 8,533,040 B2
(45) Date of Patent: Sep. 10, 2013

(54) SYSTEM AND METHOD FOR OPTIMIZING THE SELECTION AND DELIVERY OF ADVERTISEMENTS

(75) Inventor: Robert J. Collins, Brookfield, NH (US)

(73) Assignee: Yahoo! Inc., Sunnyvale, CA (US)

( * ) Notice: Subject to any disclaimer, the term of this patent is extended or adjusted under 35 U.S.C. 154(b) by 191 days.

(21) Appl. No.: 11/697,928

(22) Filed: Apr. 9, 2007

(65) Prior Publication Data

US 2007/0179857 A1    Aug. 2, 2007

Related U.S. Application Data

(63) Continuation-in-part of application No. 11/324,129, filed on Dec. 30, 2005.

(51) Int. Cl.
*G06Q 30/00* (2012.01)
*G05B 19/418* (2006.01)

(52) U.S. Cl.
USPC .................. 705/14.4; 707/752; 705/14.41

(58) Field of Classification Search
USPC ................. 705/14, 14.41; 707/752
See application file for complete search history.

(56) References Cited

U.S. PATENT DOCUMENTS 5,764,707 A * 6/1998 Gurusami et al. ............ 375/329
7,363,302 B2 * 4/2008 Lester ............................. 707/7

OTHER PUBLICATIONS

"Reaching Their Customers Through Cyberspace" Ken Baker, D. P. (Sep. 24, 1995). Copyright Chicago Tribune Co. Sep. 24, 1995. Daily Press.*

* cited by examiner

*Primary Examiner* — Victoria Vanderhorst
(74) *Attorney, Agent, or Firm* — Brinks Hofer Gilson & Lione

(57) ABSTRACT

The present invention is directed towards systems and methods for generating weights with which one or more advertisements comprising an advertisement group are selected for distribution. The method of the present invention comprises retrieving analytics data for the one or more advertisements comprising the advertisement group, and retrieving advertiser specified configuration data associated with the one or more advertisements comprising the advertisement group. A score is calculated for the one or more advertisements comprising the advertisement group, and weights are assigned to the one or more advertisements comprising the advertisement group based upon the scores and analytics data associated with the one or more advertisements.

29 Claims, 4 Drawing Sheets

SYSTEM AND METHOD FOR OPTIMIZING THE SELECTION AND DELIVERY OF ADVERTISEMENTS

The present application is a Continuation-in-Part of co-pending U.S. patent application Ser. No. 11/324,129 entitled "SYSTEM AND METHOD FOR ADVERTISEMENT MANAGEMENT," filed Dec. 30, 2005, the disclosure of which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

The present application is related to the following commonly owned U.S. Patent Applications, each of which is hereby incorporated herein by reference in its entirety:

U.S. patent application Ser. No. 11/321,888, entitled "SYSTEM AND METHOD FOR OPTIMIZING THE DELIVERY OF ADVERTISEMENTS," filed Dec. 28, 2005; and U.S. patent application Ser. No. 11/321,729, entitled "SYSTEM AND METHOD FOR OPTIMIZING ADVERTISEMENT CAMPAIGNS USING A LIMITED BUDGET," filed Dec. 28, 2005.

FIELD OF THE INVENTION

The present invention generally provides methods and systems for facilitating the selection and delivery of advertisements. More specifically, the present invention provides methods and systems that select advertisements from among a group of advertisements for display to users on the basis of analytics data and one or more advertiser specified values.

BACKGROUND OF THE INVENTION

Advertisements are commonly used on the Internet to promote various products and services. Advertisements may comprise banner ads, links to web pages, images, video, text, etc. The various advertisements used to promote products on the Internet may be displayed according to a variety of formats, such as in conjunction with a ranked result set in response to a query, embedded in a web page, a pop-up, etc. The advertisements displayed to a user of a client device may be selected, redirecting a user to a website providing the product or service advertised.

Client devices, communicatively coupled to a network such as the Internet, are capable of accessing various websites which may display advertisements. For example, a user of a client device may submit a search query comprising one or more terms to a search engine, which causes the search engine to retrieve a result set comprising links to content, as well as advertisements responsive to the search terms provided by a user. The search engine displays the result set that it generates to a user who may then select or view items in the result set, including one or more advertisements.

Advertisements displayed in response to a user's query, embedded within a webpage, displayed as a pop-up, etc., are often retrieved according to a predetermined algorithm. For example, the advertisements presented to a user may be selected according to an algorithm that determines the frequency with which a query term appears in a given web advertisement. Similarly, the advertisements embedded in a web page may be selected based upon the terms appearing in the respective web page. Retrieval and delivery methodologies for advertisements using query term frequency or web page content are tailored to provide users with advertisements based upon each advertisement's relevancy with respect to a query or web page. However, while such retrieval and delivery methods are capable of providing users with results that are relevant links to content, these methods fail to take into account the profit interests and needs of the search engine provider and the advertisers providing the advertisements.

Different advertisements may be more profitable or less profitable for a search engine provider to display as the amount paid by each advertiser for displaying an advertisement varies. Additionally, because a search engine provider may charge an advertiser a fee for each advertisement selected by a user, the frequency with which an advertisement is selected may be a significant factor in selecting which advertisements to display in response to a query, within a web page, as a pop-up, etc. Advertisers may have a plurality of advertisements pertaining to a particular product or service, whereby the advertiser measures the success of an advertisement by examining the number of users who select the advertisement when displayed on client devices. Because users may be more responsive to a particular advertisement among a plurality of advertisements pertaining to a similar product or service, the advertiser may desire to display the most successful advertisements in order to increase the likelihood that users purchase the advertiser's products or services.

One methodology for measuring the effectiveness of an advertisement utilizes "click through rate," which is a measure of the number of users who select a given advertisement. However, because advertisements may be delivered in a ranked result set, at varying times, to different web pages, etc., click through rate fails to adequately measure the success or effectiveness of an advertisement. For example, an advertisement or other item of content ranked and displayed first in a result set or displayed during peak hours of Internet traffic is more likely to be selected by a given user than an item ranked second, third, etc., or displayed during off-peak hours. Therefore, an advertisement ranked first in a result set or appearing during peak hours may often receive the greatest user response, thereby resulting in the greatest click through rate for a group of advertisements. However, simply using click through rate as a measure of effectiveness does not provide a search engine or advertiser with an accurate representation of the success of a given advertisement.

Additionally, various advertisements may be associated with products or services that when purchased in response to such advertisements result in varying levels of profit for a given advertisements. For example, a first advertisement, though more frequently selected by users, may generate insignificantly less revenue for an advertiser in comparison to a second advertisement, less frequently selected by users. Accordingly, an advertiser may wish to display advertisements that are not simply associated with a greatest click through rate, but that result in the greatest profit for the advertiser. Click through rate thus fails to adequately account for the value, such as profit, that an advertiser may associated with one or more advertisements of a given advertisement group.

Current methods and systems for selecting advertisements for delivery to users from a plurality of advertisements fail to take into account both the relevancy, effectiveness, and advertiser specified values associated with one or more advertisements. In order to overcome shortcomings associated with existing advertisement selection and delivery techniques, embodiments of the present invention provide systems and methods for selecting advertisements based upon analytics data indicating the performance of advertisements, as well as advertiser specified values

SUMMARY OF THE INVENTION

The present invention is directed towards systems and methods for generating one or more weights with which one or more advertisements comprising an advertisement group are selected for distribution. The method of the present invention comprises retrieving analytics data for the one or more advertisements comprising the advertisement group. The analytics data retrieved may include, but is not limited to, data indicating the frequency with which a given advertisement was displayed, data indicating the frequency with which a given advertisement was selected by one or more users of client devices, and data indicating the frequency with which a given advertisement resulted in a purchase of a product.

The method further comprises retrieving advertiser specified configuration data associated with the one or more advertisements comprising the advertisement group, wherein advertiser specified configuration may comprise one or more funnel values. According to one embodiment of the present invention, a funnel value comprises an indication of a relative value of displaying one or more advertisements, a relative value of a user selection of one or more advertisements, a relative value of a user purchasing a product in response to one or more advertisements, or a relative value of revenue generated from a user purchase of a product in response to one or more advertisements.

Alternatively, or in conjunction with the foregoing, advertiser specified configuration data may comprise one or more advertiser specified importance values, where an importance value may comprise an indication of a relative importance of one or more advertising metrics.

A score is calculated for the one or more advertisements comprising the advertisement group. According to one embodiment of the present invention, a score is calculated for a given advertisement through use of the analytics data associated with the advertisement and the advertiser specified configuration data. A score calculated for a given advertisement provides an indication of a relative quality of the advertisement with respect to the one or more advertisements comprising the advertisement group.

The method further comprises assigning weights to the one or more advertisements comprising the advertisement group based upon the scores and analytics data associated with the one or more advertisements, wherein a weight comprises a numerical value indicating a frequency with which an advertisement is to be distributed. Alternatively, or in conjunction with the foregoing, a weight may comprise a numerical value indicating an amount by which analytics data associated with a given advertisement is to be increased or decreased.

According to one embodiment, assigning a weight to a given advertisement comprises performing a comparison between the advertisement and the one or more advertisements comprising the advertisement group, and assigning a weight to the advertisement based upon the comparison. Performing a comparison may comprise performing a comparison with respect to the scores associated with the advertisements and analytics data associated with the advertisements indicating a frequency with which the advertisements were displayed.

The method of the present invention further comprises determining a statistical significance in difference, such as through use of a Chi square test for statistical significance, between the scores associated with the advertisements and analytics data associated with the advertisements indicating a frequency with which the advertisements were displayed.

The present invention is further directed toward a system for generating weights with which one or more advertisements comprising an advertisements group are selected for distribution. The system of the present invention comprises a scoring component operative to retrieve analytics data and advertiser specified configuration data associated with the one or more advertisements comprising the advertisement group. The scoring component utilizes the retrieved analytics data and the advertiser specified configuration data to generate scores for the one or more advertisements comprising the advertisement group, wherein a score for a given advertisement may comprise an indication of a relative quality of the advertisement with respect to the one or more advertisements comprising the advertisement group.

The analytics data retrieved by the scoring component may comprises data indicating the frequency with which the one or more advertisements comprising the advertisement group were displayed, data indicating the frequency with which the one or more advertisements comprising the advertisement group were selected by one or more users of client devices, or data indicating the frequency with which a purchase of a product was made in response to one or more advertisements comprising the advertisement group.

The advertiser specified configuration data retrieved by the scoring component may comprise one or more funnel values, wherein a funnel may comprise an indication of a relative value of displaying one or more advertisements, or an indication of a relative value of a user selection one or more advertisements. The advertiser specified configuration may also comprise an indication of a relative value of a user purchasing a product in response to one or more advertisements or an indication of a relative value of revenue generated form a user purchase of a product in response to one or more advertisements. Alternatively, or in conjunction, the advertiser specified configuration data retrieved by scoring component may comprise one or more importance values, wherein an importance value may comprise an indication of a relative importance of one or more advertising metrics.

The system of the present invention further comprises a statistical component operative to perform one or more comparisons between the scores and analytics data associated with one or more advertisements comprising the advertisement group. According to one embodiment of the present invention, the statistical component is operative to perform a comparison with respect to the scores associated with one or more advertisements and analytics data associated with one or more advertisements indicating a frequency with which the advertisements were selected by one or more users.

The statistical component is further operative to determine a statistical significance in difference between the scores associated with one or more advertisements and analytics data associated with one or more advertisements indicating a frequency with which the advertisements were selected by one or more users of client devices, such as through use of a Chi square test.

A weight component is operative to assign weights to the one or more advertisements comprising the advertisement group based upon the one or more performed comparisons.

According to one embodiment of the present invention, the weight component is operative to assign weights to the one or more advertisements based upon the statistical significance in difference between the scores associated with one or more advertisements and analytics data associated with one or more advertisements indicating a frequency with which the advertisements were selected by one or more users of client devices.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
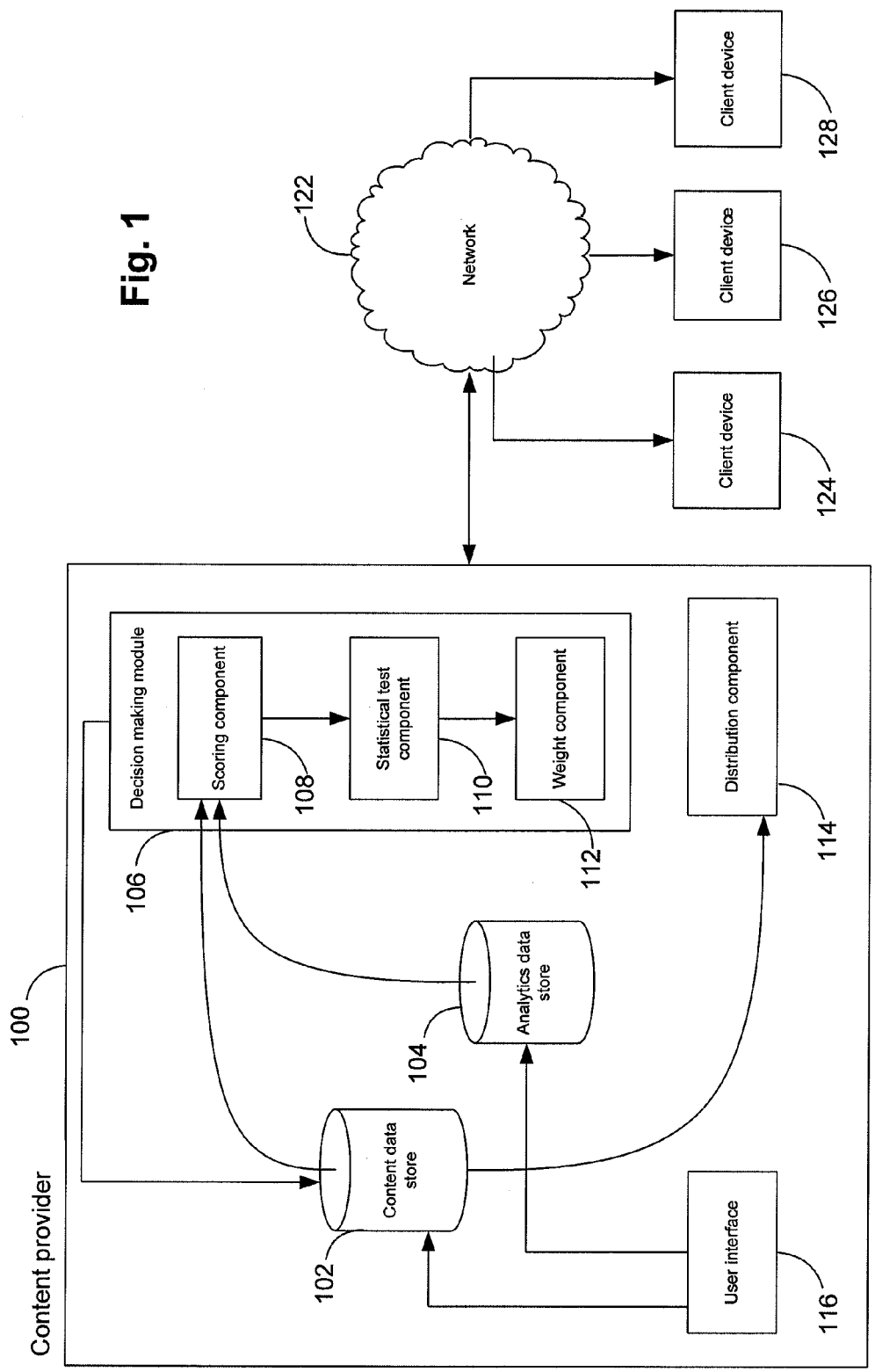
FIG. 1 is a block diagram illustrating one embodiment of a system for selecting one or more advertisements for display to one or more users based upon analytics data and one or more advertiser specified values according to one embodiment of the present invention.

FIG. 1 is a block diagram illustrating one embodiment of a system for selecting advertisements to be distributed on the basis of one or more advertiser specified values and analytics data associated with one or more advertisements. According to the embodiment illustrated in FIG. 1, a content provider 100 maintains one or more advertisements in a content data store 102. The one or more advertisements maintained in the content data store 102 at the content provider 100 may be maintained in one or more advertisement groups. According to one embodiment of the present invention, an advertisement group comprises one or more advertisements associated with a given advertiser that are directed towards selling a common product or service. For example, a first advertisement group associated with a given advertiser may comprise one or more advertisements directed toward advertising domestic automobiles, whereas as a second advertisement group associated with the advertiser may comprise one or more advertisements directed toward advertising foreign automobiles. The content data store 102 at the content provider 100 may maintain one or more advertisement groups for one or more advertisers.

In addition to one or more advertisements, the content data store 102 may maintain one or more advertiser specified funnel values indicating the relative value of one or more advertising metrics associated with one or more advertisement groups. Exemplary methods for utilizing one or more advertiser specified funnel values indicating the relative value of one or more advertising metrics associated with one or more advertisements or advertisement group are described in commonly owned U.S. patent application Ser. No. 11/321/729, entitled "SYSTEM AND METHOD FOR OPTIMIZING ADVERTISEMENT CAMPAIGNS USING A LIMITED BUDGET," the disclosure of which is hereby incorporated by reference in its entirety.

According to one embodiment of the invention, an advertiser may specify, through use of a user interface 116 at the content provider 100, values associated with one or more advertising metrics, including, but not limited to, impressions, clicks, conversions, and conversion revenue. For example, through use of the user interface 116 at the content provider 100, an advertiser may specify that an impression for one or more advertisements comprising a given advertisement group is worth one half (½) of the value of a user selection of an advertisement (e.g., "click,"), which is worth one third (⅓) of the value of a user making a purchase in response to an advertisement (e.g., "conversion"). An advertiser may further specify that the revenue generated from a conversion in response to a first advertisement group is worth twice as much as the revenue generated from a conversion in response to a second advertisement group (e.g., "conversion revenue"). Alternatively, or in conjunction with the foregoing, an advertiser may specify the importance of one or more advertising metrics. For example, an advertiser may specify the importance of an impression, click, or conversion, for one or more advertisements comprising one or more advertisement groups associated with the advertiser.

The one or more advertisements comprising the one or more advertisement groups maintained in the content data store 102 may be distributed by a distribution component 114 at the content provider to one or more client devices 124, 126, and 128. Client devices 124, 126, and 128 are communicatively coupled to a network 122, which may include a connection to one or more local and wide area networks, such as the Internet. According to one embodiment of the invention, a client device 124, 126 and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Users of client devices 124, 126, and 128 to which one or more advertisements are displayed may interact with the one or more advertisements. For example, a user of a client device 124, 126, and 128 may select a given advertisement through use of a selection device, such as a mouse or keyboard, redirecting the user of the client device 124, 126, and 128 to a website of an advertiser associated with the selected advertisement. The user of the client device 124, 126, and 128 may thereafter view one or more products on the advertiser's website page and select one or more products that the user wishes to purchase, resulting in a conversion in response to the advertisement selected by the user.

Information associated with the display and user interaction with one or more advertisements is delivered to an analytics data store 104 at the content provider 100. The analytics data store 104 is operative to maintain analytics data for the one or more advertisements maintained in the content data store 102 and distributed by the distribution component 114. The analytics data maintained by the analytics data store 104 may include information including, but not limited, the frequency with which one or more advertisements were displayed (e.g., "impressions") to one or more users of client devices 124, 126, and 128, the frequency with which one or more advertisements were selected (e.g., "clicks") by one or more users of client devices, and the frequency with which one or more advertisements resulted in a user of a client device 124, 126, and 128 making a purchase (e.g., "conversions").

The analytics data store 104 may be implemented an accessible memory structure such as a database, CD-ROM, tape, digital storage library, etc., and may be implemented as a database or any other type of data storage structure capable of providing for the retrieval and storage of a variety of data types. The analytics data store 104 may store a variety of data related to one or more advertisements, which may be maintained according to advertisement group, advertiser, advertising metric, or a combination thereof.

The advertiser specified funnel values and importance values associated with one or more advertisements comprising a given advertisement group maintained in the content data store 102, as well as the analytics data associated with the one or more advertisements maintained in the analytics data store 104, may be delivered to a decision making module 106 at the content provider 100. The decision making module 106 is operative to utilize the advertiser specified funnel values, importance values, and analytics data associated with one or more advertisements comprising a given advertisement group to assign weights to the one or more advertisements, which may be used to select and distribute advertisements to one or more client devices 124, 126, and 128.

A scoring component 108 at the decision making module is operative to receive the analytics data associated with one or more advertisements, as well as the advertiser specified funnel and importance values associated with the one or more advertisements. Upon receipt, the scoring component 108 is operative to normalize the analytics data associated with the one or more advertisements. The process of normalizing the analytics data associated with the one or more advertisements is performed in order to normalize differences due to various factors associated with the display of advertisements. For example, a first advertisement in an advertisement group may be displayed during peak hours when users of client devices 124, 126, and 128 are most active, and thus, most likely to select advertisements, whereas a second advertisement in the advertisement may be displayed during off-peak hours when users of client devices 124, 126, and 128 are less likely to select advertisements. The analytics data associated with the first and second advertisement may indicate the frequency with which the advertisements have been selected by users of client devices 124, 126, and 128. The analytics data associated with the first and second advertisement indicating the frequency with which the advertisements have been selected may be normalized in order to effectively compare the analytics data associated with the advertisements.

The scoring component 108 is further operative to generate a score for the one or more advertisements comprising a given advertisement group. According to one embodiment of the present invention, the scoring component 108 generates a score for a given advertisement through use of the advertiser specified importance and funnel values, the normalized analytics data associated with the advertisement, and the normalized analytics data associated with the one or more advertisements comprising the advertisement group to which the advertisement belongs. The score generated for the one or more advertisements comprising an advertisement group provides an indication of the relative value of a given advertisement with respect to the one or more advertisements comprising the advertisement group.

The scoring component 108 delivers the score generated for the one or more advertisements comprising the advertisement group, as well as the analytics data associated with the one or more advertisements comprising the advertisement group, to a statistical component 110. The statistical component is operative to perform a comparison of the one or more advertisements comprising the advertisement group and determine the statistical significance of the differences between the advertisements with respect to the scores associated with the one or more advertisements and one or more advertising metrics. According to one embodiment of the present invention, the statistical component 110 performs a comparison with respect to the score associated with the one or more advertisements, as generated by the scoring component 108, and the analytics data indicating the frequency with which the one or more advertisements comprising the advertisement group were displayed (e.g., "impressions") to one or more users of client devices 124, 126, and 128, and determines the statistical significance between the values associated with the one or more advertisements. According to one embodiment of the invention, the statistical component 110 utilizes a chi square test for statistical significance to determine whether a statistically significant difference exists between the advertisements with respect to the abovementioned scores and one or more advertising metrics.

The results of the comparisons performed by the statistical component 110 are thereafter delivered to a weight component 112. The weight component is operative to assign weights to the one or more advertisements comprising the advertisement group. For example, the weight component 112 may utilize the scores and analytics data indicating the frequency with which the one or more advertisements comprising the advertisement group were displayed, as well as the statistical significance data indicating the differences between the advertisements, in order to generate weights for the one or more advertisements.

The weights generated by the weight component are thereafter delivered to the content data store 102. The weights associated with the one or more advertisements may be used by the distribution component 114 to select and deliver advertisements to one or more client devices 124, 126, and 128. For example, the distribution component may select the one or more advertisements from the content data store 102 comprising a given advertisement group with associated weights exceeding a given weight threshold. Alternatively, or in conjunction with the foregoing, the distribution component 114 may calculate the products of the weights associated with the one or more advertisements comprising a given advertisement and the analytics data associated with the advertisements for one or more advertising metrics, and utilize the resulting products to select one or more advertisements for delivery to one or more client devices 124, 126, and 128. Those of skill in the art recognize the plurality of techniques for utilizing weights associated with one or more advertisements in order to select advertisement for delivery to client devices 124, 126, and 128.

Figure 2:
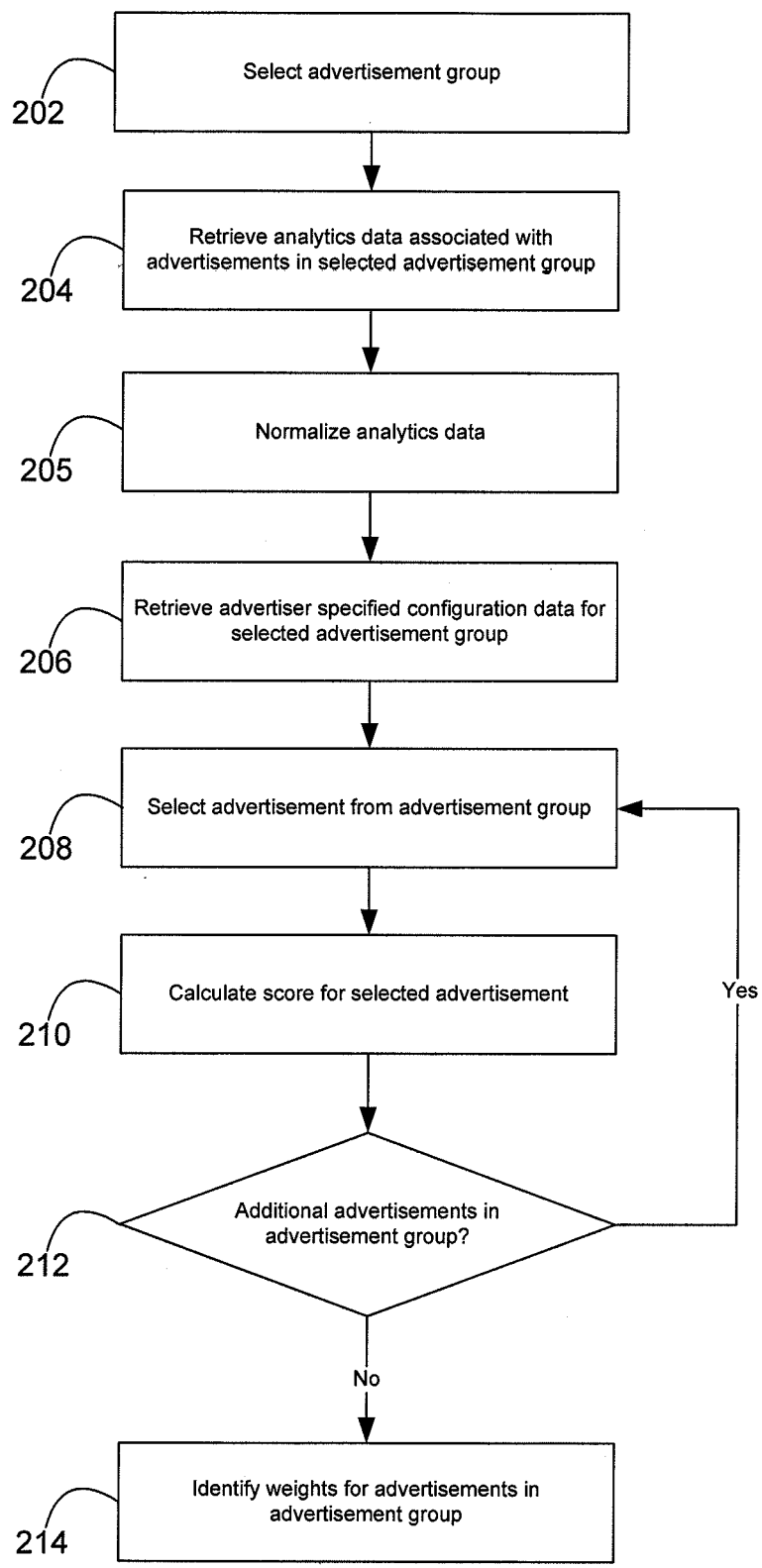
FIG. 2 is a flow diagram illustrating one embodiment of a method for generating weights for one or more advertisements comprising an advertisement group according to one embodiment of the present invention.

FIG. 2 is a flow diagram illustrating one embodiment of a method for generating weights for one or more advertisements comprising an advertisement group. According to the embodiment illustrated in FIG. 2, a given advertisement group is selected from among one or more advertisement groups, wherein an advertisement group may comprise one or more advertisements directed toward advertising a common product or service, step 202. Analytics data associated with the selected advertisement group is retrieved, step 204. The analytics data for a given advertisement group may comprise information including, but not limited to, data indicating the frequency with which the one or more advertisements comprising the advertisement group were displayed to one or more users, data indicating the frequency with which the one or more advertisements comprising the advertisement group were selected by one or more users, and data indicating the frequency with which one or more conversions were made in response to one or more user selections of the one or more advertisements comprising the advertisement group.

The analytics data retrieved for the selected advertisement group is normalized, step 205. Normalization of the analytics data is performed in order to eliminate differences between the analytics data associated with the one or more advertisements due to various factors, including, but not limited to, the time at which the one or more advertisements were displayed, the frequency with which the advertisements were displayed, and the revenue generated from the one or more advertisements. For example, a first advertisement displayed one thousand (1,000) times may have been selected by users of client devices two hundred (200) times, whereas a second advertisement displayed one hundred (100) times may have been selected fifty (50) times. Though the frequency with which the first advertisement was selected exceeds the frequency with which the second advertisement was selected, normalization of the analytics data facilitates performing a comparison of the effectiveness of the advertisements.

Advertiser specified configuration data for the selected advertisement group is thereafter retrieved, step 206. Advertiser specified configuration data may include, but is not limited to, one or more advertiser specified funnel values and importance values. According to one embodiment of the present invention, advertiser specified funnel values and importance values indicate the relative value of one or more advertising metrics. For example, an advertiser may specify the value of an impression relative to the value of a click or conversion. Alternatively, or in conjunction with the foregoing, an advertiser may specify the relative value associated with revenue generated in response to a first advertisement in the advertisement group relative to the value associated with revenue generated in response to a second advertisement in the advertisement group.

A given advertisement is selected from among the one or more advertisements comprising the selected advertisement group, step 208. According to the embodiment illustrated in FIG. 2, a score is calculated for the selected advertisement, step 210. The score calculated for the selected advertisement indicates the relative value of the advertisement with respect to the one or more advertisements comprising the advertisement group to which the advertisement belongs. According to one embodiment of the present invention, a score is calculated for a given advertisement through use of the normalized analytics data associated with the advertisement, as well as the advertiser specified importance and funnel values for one or more advertising metrics according to methods described herein.

A check is thereafter performed to determine whether a score is to be generated for one or more additional advertisements comprising the selected advertisement group, step 212. If a score is to be calculated for one or more additional advertisements in the selected advertisement group, an advertisement is selected from among the one or more advertisements comprising the advertisement group.

After a score has been calculated for the one or more advertisements comprising the selected advertisement group, weights are assigned to the one or more advertisements, step 214. According to one embodiment of the present invention, the weight associated with a given advertisement provides a numerical value indicating the relative performance of the advertisement. Alternatively, or in conjunction with the foregoing, a weight associated with a given advertisements provides a numerical value indicating the extent to which the analytics data associated with the advertisement is to be decreased or increased. For example, a first advertisement in a given advertisement group may be associated with a weight of "0.8", whereas a second advertisement in the advertisement group may be associated with a weight of "0.6". The weights may be applied to the analytics data associated with the advertisements, resulting in the analytics data associated with the first advertisement being discounted by a factor of "0.2" and the analytics data associated with the second advertisement being discounted by a factor of "0.4".

Figure 3:
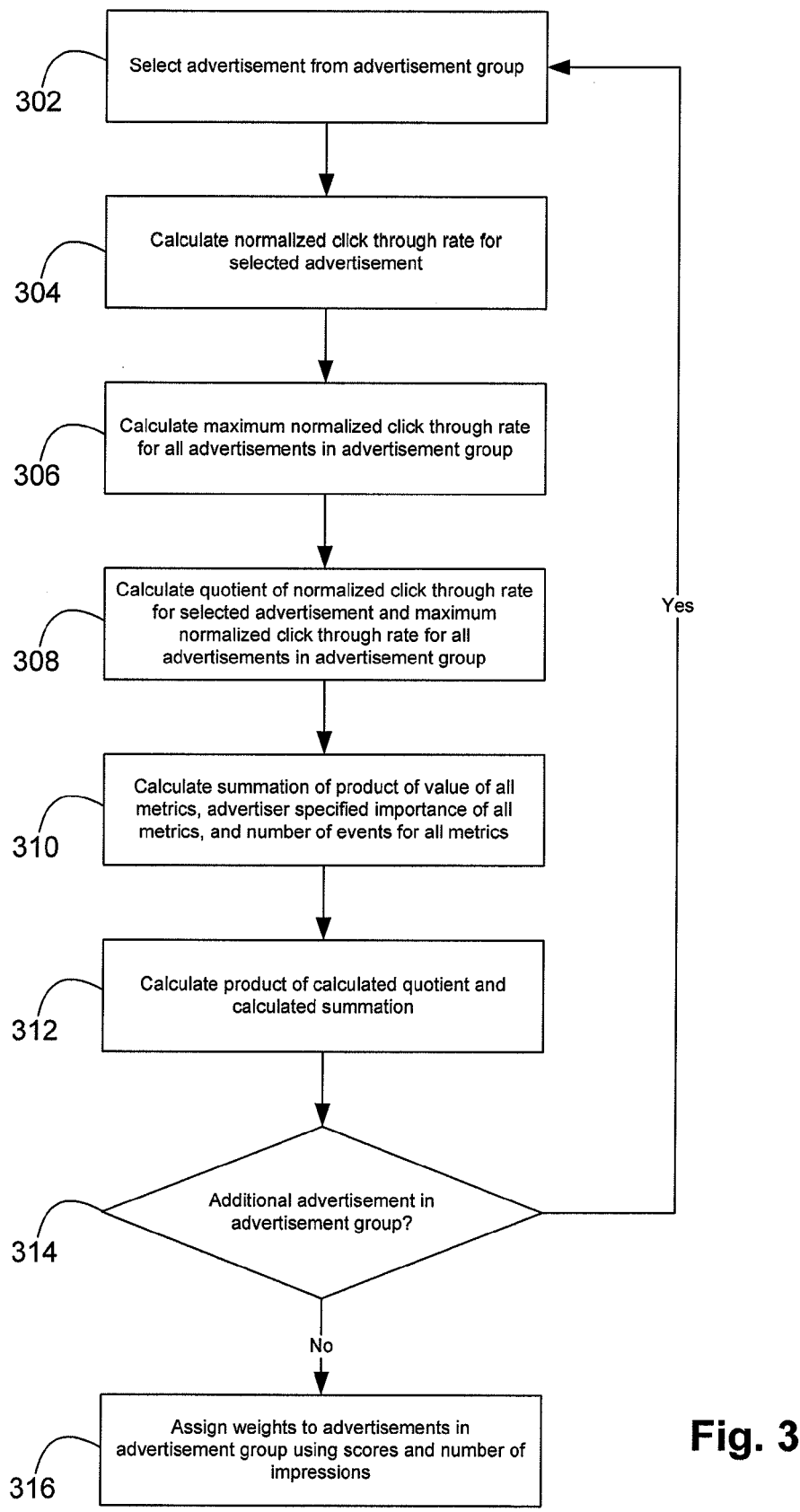
FIG. 3 is a flow diagram illustrating one embodiment of a method for generating a score for one or more advertisements comprising an advertisement group based upon analytics data and one or more advertiser specified values according to one embodiment of the present invention.

FIG. 3 is a flow diagram illustrating one embodiment of a method for generating a score for one or more advertisements comprising an advertisement group based upon analytics data and one or more advertiser specified funnel and importance values. According to the embodiment illustrated in FIG. 3, a given advertisement is selected from among the one or more advertisement comprising an advertisement group, step 302. The analytics data associated with the selected advertisement is used to calculate a normalized click through rate for the advertisement, step 304. As previously described, normalization of the analytics data may be performed to normalize differences due to various factors associated with the display of an advertisement. For example, the analytics data associated with a first given advertisement displayed at peak times during which users select advertisements, or at greater frequency, may need to be normalized in order to effectively compare the performance of the first advertisement with respect to a second advertisement displayed at off-peak time, or less frequently than the first advertisement.

A maximum normalized click through rate is calculated for the one or more advertisements comprising the advertisement group to which the selected advertisement belongs, step 306. Similar to the normalized click through rate for the selected advertisement, the analytics data associated with the one or more advertisements comprising the advertisement to which the selected advertisement belongs indicating the frequency with which the one or more advertisements were selected by users of client devices is used to calculate a maximum normalized click through rate for the advertisement group. The quotient of the normalized click through rate for the selected advertisement and the maximum normalized click through rate for the advertisement group is thereafter calculated, step 308.

Additionally, the summation of the product of the value the advertiser associated with the selected advertisement has assigned to one or more advertising metrics, the importance the advertiser has assigned to the one or more advertising metrics, and the number of advertising metrics events that have been observed for the one or more metrics is calculated, step 310. For example, as previously described, a given advertising metric may comprise the frequency with which an advertisement is displayed (e.g., "impressions") to users of client devices. An advertiser may specify the value of an impression for one or more advertisements comprising a given advertisement group, as well as the relative importance of an impression. The product of the advertiser specified value, importance, and the frequency with which a given advertisement has been displayed (e.g., number of "impressions") may be calculated. The abovementioned summation may be calculated for the one or more metrics for which an advertiser has specified a value and importance.

The product of the foregoing quotient and the summation is thereafter calculated, yielding a score for the selected advertisement, step 312. The score associated with the advertisement indicates the relative quality or effectiveness of the advertisement with respect to the one or more advertisements comprising the advertisement group to which the advertisement belongs. A check is performed to determine whether a score is to be calculated for one or more additional advertisements in the advertisement group, step 314. If a score is to be calculated for one or more additional advertisements in the advertisement group, a next advertisement is selected, step 302. After a score has been calculated for the one or more advertisements comprising the advertisement group, weights are assigned to the one or more advertisements according to methods described herein.

Table A illustrates one embodiment of an equation that may be used to calculate a score for one or more advertisements comprising an advertisement group.

TABLE A $$S_i = \frac{nCTR_i}{\max_{j=1\ldots AG_N}(nCTR_j)} \sum_m V_m I_m N_m$$

In the equation illustrated in Table A, $S_i$ comprises the score for a given advertisement i. $nCTR_i$ is the normalized click through rate for a given advertisement i, described above in step 304.

$$\max_{j=1\ldots AG_N}(nCTR_j)$$

is the maximum normalized click through rate for the one or more advertisements comprising the advertisement group to which advertisement i belongs, described above in step 306. $V_m$ is the value the advertiser associated with advertisement i has assigned to metric m, I is the importance factor the advertiser has assigned to metric m, and N is the number of events that have been observed for metric m, as described above in steps 310 through 312.

Figure 4:
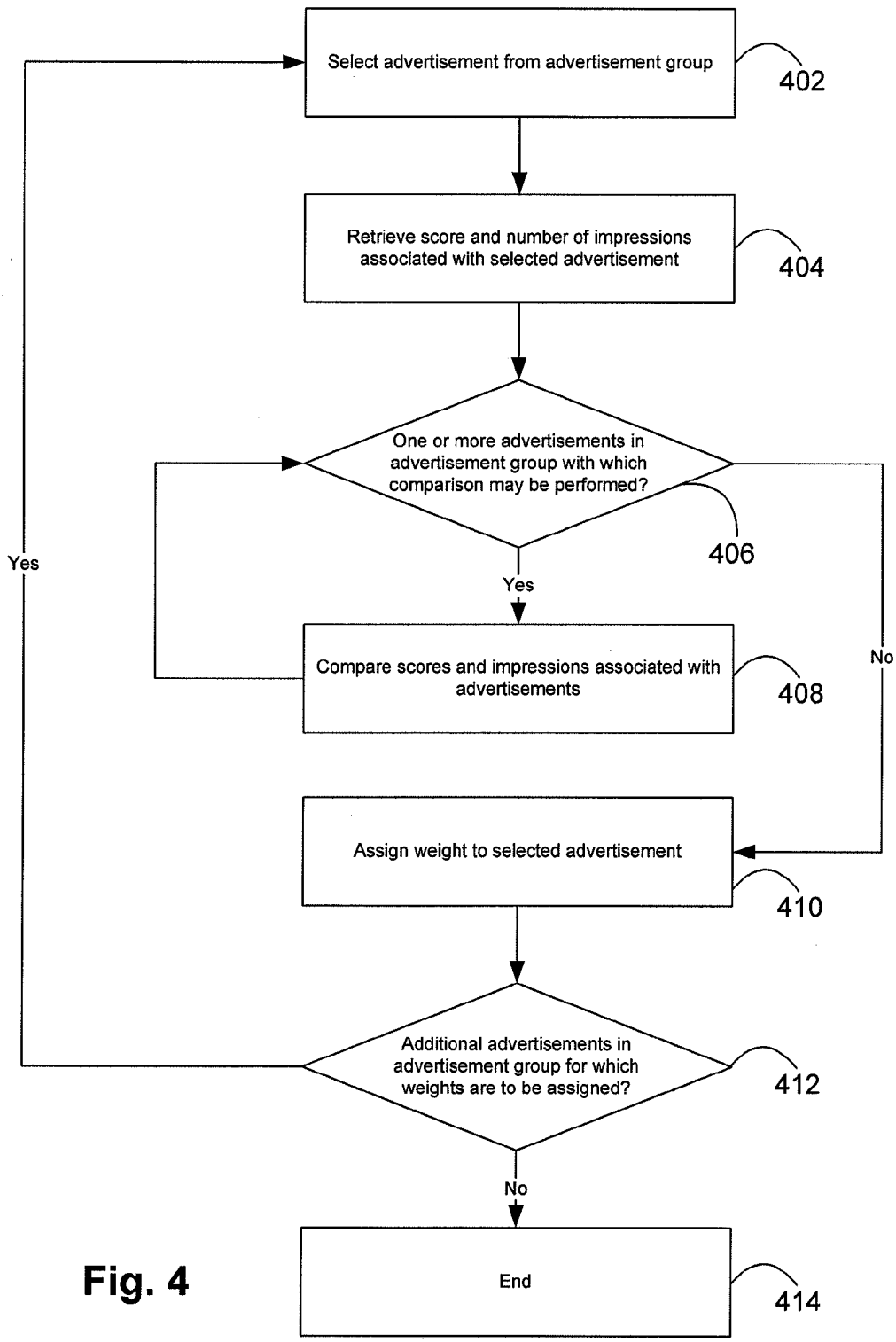
FIG. 4 is a flow diagram illustrating one embodiment of assigning weights to one or more advertisements comprising an advertisement group according to one embodiment of the present invention.

FIG. 4 is a flow diagram illustrating one embodiment of assigning weights to one or more advertisements comprising an advertisement group through use of the foregoing scores associated with the advertisements, as well as analytics data associated with the advertisements. According to the embodiment illustrated in FIG. 4, a given advertisement for which a score has been calculated, according to methods described herein, is selected from among one or more advertisements comprising an advertisement group, step 402. The score associated with the selected advertisement, which may be calculated through use of the equation illustrated in Table A, is retrieved, as well as the normalized analytics data associated with the selected advertisement indicating the frequency with which the advertisement was displayed (e.g., "impressions."), step 404.

A check is performed to determine whether there are one or more advertisements in the advertisement group to which the selected advertisement belongs with which a comparison may be performed, step 406. If there are one or more additional advertisements in the advertisement group, a comparison is performed between the selected advertisement and an advertisement in the advertisement group to which the selected advertisement belongs, step 408. According to the embodiment illustrated in FIG. 4, a comparison is performed with respect to the score and the analytics data indicating the frequency with which the advertisements were displayed to one or more users of client devices.

If there are no advertisements in the advertisement group to which the selected advertisement belongs with which a comparison may be performed, or after a comparison has been performed between the selected advertisement and the one or more advertisements comprising the advertisement group to which the selected advertisement belongs, a weight is assigned to the selected advertisement, step 410. According to one embodiment of the present invention, the weight assigned to the selected advertisement is based upon the statistical significance of the difference between the score and analytics data indicating the frequency with which the selected advertisements was displayed, and the scores and analytics data indicating the frequency with which the one or more advertisements comprising the advertisement group to which the selected advertisement belongs.

A check is thereafter performed to determine whether weights are to be assigned to one or more advertisements in the advertisement group, step 412. If weights are to be assigned to one or more additional advertisements, a next advertisement is selected, step 402. After weights have been assigned to the one or more advertisements comprising the advertisement group, processing terminates, step 414. The weights assigned to the one or more advertisements comprising the advertisement group may be used to select advertisements for distribution to client devices.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A method for executing instructions stored in memory by one or more processors to generate weights with which one or more advertisements comprising an advertisement group are selected for distribution, the method comprising:
    retrieving analytics data for a plurality of advertisements comprising an advertisement group, the analytics data including a plurality of advertising metrics and a frequency associated with the plurality of advertising metrics;
    retrieving advertiser specified configuration data associated with the plurality of advertisements comprising the advertisement group, the advertiser specified configuration data includes a plurality of funnel values, each of the funnel values indicating a worth associated with at least one of the plurality of advertising metrics relative to at least one other of the plurality of advertising metrics, and one or more advertiser specified importance values of the plurality of advertising metrics;
    calculating, via a computer, a score for each of the plurality of advertisements on the basis of the funnel values, the one or more advertiser specified importance values of the plurality of advertising metrics, and the analytics data, the score indicating a relative quality of a given one of the plurality of advertisements with respect to the plurality of advertisements comprising the advertisement group to which the given one of the plurality of advertisements belongs;
    comparing the scores of the plurality of advertisements with the analytics data of the plurality of advertisements, wherein the analytics data includes data associated with the display of the advertisements;
    determining a statistical significance in a difference between the scores and the analytics data;
    assigning, via the computer, weights to the one or more plurality of advertisements based upon the comparison of the scores and the analytics data and based upon the determination of the statistical significance in the difference between the scores and the analytics data; and
    utilizing the weights to select and distribute the one or more plurality of advertisements.

2. The method of claim 1, wherein retrieving analytics data comprises retrieving data indicating the frequency with which a given advertisement was displayed.

3. The method of claim 1, wherein retrieving analytics data comprises retrieving data indicating the frequency with a given advertisement was selected by one or more users of client devices.

4. The method of claim 1, wherein retrieving analytics data comprises retrieving data indicating the frequency with which a given advertisement resulted in a purchase of a product.

5. The method of claim 1, wherein a funnel value comprises an indication of a relative value of displaying one or more advertisements.

6. The method of claim 1, wherein a funnel value comprises an indication of a relative value of a user selection of one or more advertisements.

7. The method of claim 1, wherein a funnel value comprises an indication of a relative value of a user purchasing a product in response to one or more advertisements.

8. The method of claim 1, wherein a funnel value comprises an indication of a relative value of revenue generated from a user purchase of a product in response to one or more advertisements.

9. The method of claim 1, wherein retrieving advertiser specified configuration data comprises retrieving the one or more advertiser specified importance values.

10. The method of claim 9, wherein an advertiser specified importance value comprises an indication of a relative importance of one or more advertising metrics.

11. The method of claim 1, wherein calculating a score for a given advertisement comprises calculating a score through use of the analytics data associated with the advertisement and the advertiser specified configuration data.

12. The method of claim 1, wherein assigning a weight to a given advertisement comprises assigning a numerical value indicating a frequency with which the advertisement is to be distributed.

13. The method of claim 1, wherein assigning a weight to a given advertisement comprises assigning a numerical value indicating an amount by which analytics data associated with the advertisement is to be increased or decreased.

14. The method of claim 1, wherein determining a statistical significance in difference comprises determining through use of a Chi square test for statistical significance.

15. A system for generating weights with which one or more advertisements comprising an advertisement group are selected for distribution, the system comprising:
    a computer processing and memory containing a scoring component, which when executed by the computer processor:
    retrieves analytics data and advertiser specified configuration data associated with a plurality of advertisements comprising an advertisement group, the analytics data including a plurality of advertising metrics and a frequency associated with the plurality of advertising metrics, the advertiser specified configuration data includes a plurality of funnel values, each of the funnel values indicating a worth associated with at least one of the plurality of advertising metrics relative to at least one other of the plurality of advertising metrics, and one or more advertiser specified importance values of the plurality of advertising metrics; and generates scores for each of the plurality of advertisements on the basis of the funnel values, the one or more advertiser specified importance values of the plurality of advertising metrics, and the analytics data, the scores indicating a relative quality of a given one of the plurality of advertisements with respect to the plurality of advertisements comprising the advertisement group to which the given one of the plurality of advertisements belongs;

the memory containing a statistical component, which when executed by the computer processor performs one or more comparisons between the scores of the plurality of advertisements and the analytics data of the plurality of advertisements, wherein the statistical component further determines a statistical significance in a difference between the scores associated with one or more advertisements and the analytics data;

the memory containing a weight component, which when executed by the computer processor assigns weights to the plurality of advertisements based upon the one or more performed comparisons of the scores and the analytics data and based upon the determination of the statistical significance in the difference between the scores and the analytics data; and the memory containing a distribution component, which when executed by the computer processor utilizes the weights to select and distribute the plurality of advertisements.

16. The system of claim 15, wherein the scoring component is operative to retrieve analytics data indicating the frequency with which the one or more advertisements comprising the advertisement group were displayed.

17. The system of claim 15, wherein the scoring component is operative to retrieve analytics data indicating the frequency with which the one or more advertisements comprising the advertisement group were selected by one or more users of client devices.

18. The system of claim 15, wherein the scoring component is operative to retrieve analytics data indicating the frequency with which a purchase of a product was made in response to one or more advertisements comprising the advertisement group.

19. The system of claim 15, wherein the statistical component is operative to perform a comparison with respect to the scores associated with one or more advertisements and analytics data associated with the display of the one or more advertisements.

20. The system of claim 15, wherein a funnel value comprises an indication of a relative value of displaying one or more advertisements.

21. The system of claim 15, wherein a funnel value comprises an indication of a relative value of a user selection of one or more advertisements.

22. The system of claim 15, wherein a funnel value comprises an indication of a relative value of a user purchasing a product in response to one or more advertisements.

23. The system of claim 15, wherein a funnel value comprises an indication of a relative value of revenue generated from a user purchase of a product in response to one or more advertisements.

24. The system of claim 15, wherein an advertiser specified importance value comprises an indication of a relative importance of one or more advertising metrics.

25. The system of claim 15, wherein the statistical component is operative to utilize a Chi square test for determining a statistical significance in difference between the scores associated with one or more advertisements and analytics data associated with the display of the one or more advertisements.

26. The system of claim 15, wherein the weight component operative to assign weights to the one or more advertisements comprising the advertisement group based upon the statistical significance in difference between the scores associated with one or more advertisements and analytics data associated with the display of the one or more advertisements.

27. A non-transitory medium comprising instructions executable to:

retrieve analytics data for a plurality of advertisements comprising an advertisement group, the analytics data including a plurality of advertising metrics and a frequency associated with the plurality of advertising metrics;

retrieve advertiser specified configuration data associated with the plurality of advertisements comprising the advertisement group, the advertiser specified configuration data includes a plurality of funnel values, each of the funnel values indicating a worth associated with at least one of the plurality of advertising metrics relative to at least one other of the plurality of advertising metrics, and one or more advertiser specified importance values of the plurality of advertising metrics;

calculate a score for each of the plurality of advertisements on the basis of the funnel values, the one or more advertiser specified importance values of the plurality of advertising metrics, and the analytics data, the score indicating a relative quality of a given one of the plurality of advertisements with respect to the plurality of advertisements comprising the advertisement group to which the given one of the plurality of advertisements belongs;

compare the scores of the plurality of advertisements with the analytics data of the plurality of advertisements, wherein the analytics data includes data associated with the display of the advertisements;

determine a statistical significance in a difference between the scores and the analytics data;

assign weights to the one or more plurality of advertisements based upon the comparison of the scores and the analytics data and based upon the determination of the statistical significance in the difference between the scores and the analytics data; and utilize the weights to select and distribute the one or more plurality of advertisements.

28. The non-transitory medium of claim 27, wherein the instructions are further executable to retrieve data indicating the frequency with which a given advertisement was displayed.

29. The non-transitory medium of claim 27, wherein the instructions are further executable to retrieve data indicating the frequency with a given advertisement was selected by one or more users of client devices.

* * * * *